Patented July 26, 1927.

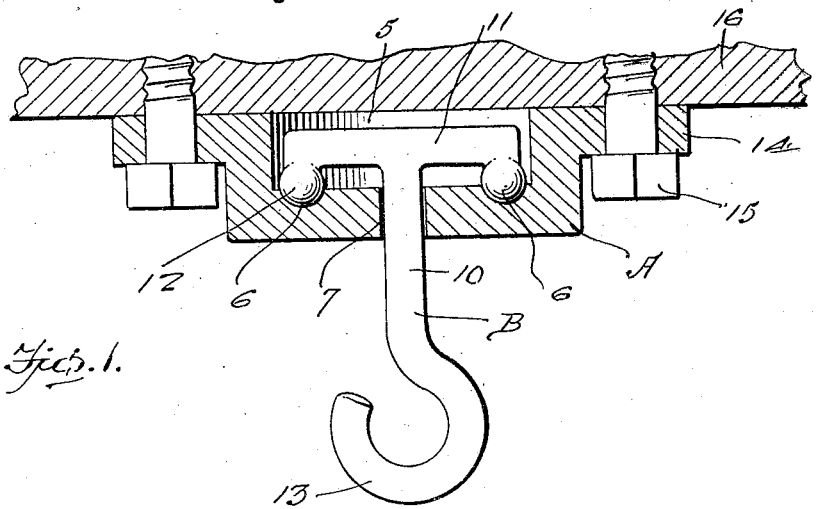
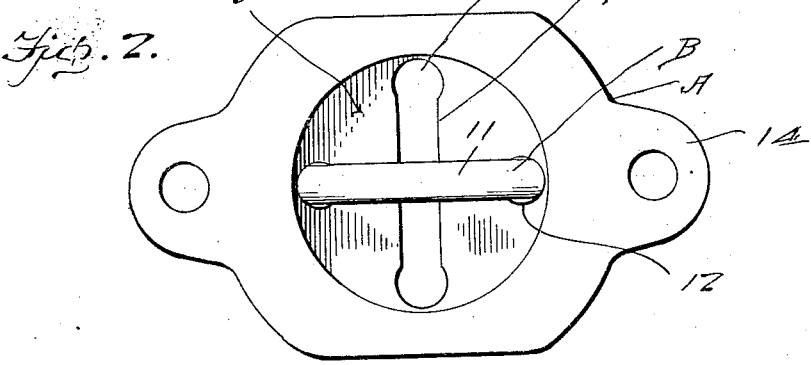
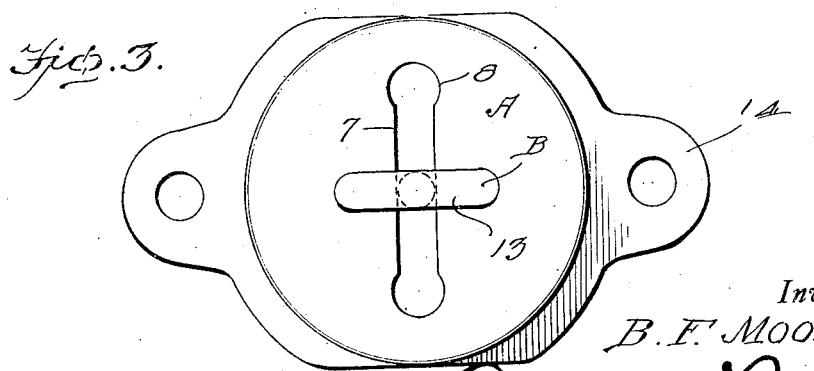

1,637,047

UNITED STATES PATENT OFFICE.

BENJAMIN FRANKLIN MOORE, OF PARKERSBURG, WEST VIRGINIA.

SWINGING HOOK.

Application filed March 13, 1926, Serial No. 94,485. Renewed June 11, 1927.

The present invention relates to a swinging hook for mounting porch swings and the like.

The principal object of the invention is to provide a hook including a mounting whereby the hook may swing freely with a minimum amount of friction.

Another very important object of the invention is to provide a combined hook and bracket having a structure whereby the hook may be quickly detached from the bracket when desired.

A still further very important object of the invention is to provide a device of this nature which is exceedingly simple in its construction, strong, durable, inexpensive to manufacture, efficient and reliable in use, and otherwise well adapted to withstand the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a sectional elevation of the device embodying the features of my invention.

Figure 2 is a top plan view thereof.

Figure 3 is a bottom plan view thereof.

Referring to the drawings in detail it will be seen that the letter A designates generally the bracket and the letter B the hook. The bracket is in the form of a plate having a recess 5 in the upper surface thereof provided with dished out seats 6. The plate is provided with an elongated slot 7 having rounded ends 8. The seats 6 are alined at right angles to the slot 7. The hook B includes a T-shaped shank having the stem portion 10 and cross head portion 11. The terminals of the cross head 11 terminate in spheres or balls 12 adapted to be received in the dished out seats 6. These balls 12 depend in respect to the head 11. The stem 10 is adapted to extend through the slot 7. The stem 10 terminates in a hook proper 13. Apertured ears 14 are provided on diametrically opposite sides of the bracket A so that screws, bolts or like fastening elements 15 may be extended therethrough and engaged with a roof or any other suitable support 16.

The bracket A is first mounted on the support 16 and the head 11 is raised upwardly through the slot 7, the rounded ends 8 thereof accommodating the balls 12. The hook is then rotated through ninety degrees so that the balls 12 may be rested in the seats 6. A drop of oil or a little grease may be placed in these seats 6 for properly lubricating the balls 12. It will be noted that this oil or grease will have no tendency to drip down along the stem 10 and hook proper 13, and thus a little bit of lubricant will last and function efficiently for a long time.

It is also to be noted that the depth of the recess 5 is sufficient so that the head 11 of the hook B may be lifted to clear the balls 12 from the seats 6 to permit the hook being rotated to place the head 11 in such position that it may be withdrawn from the recess 5 through the slot 7. Thus the hook may be assembled in relation to the bracket or disassembled therefrom without the necessity of removing the bracket from the support.

It is thought that the device has now been described in sufficient detail so as to be clearly understood in its construction, in its operation and in its advantages. It is desired, however, to point out that the embodiment of the invention which I have disclosed is very simple in its construction, affords ease of assembly and disassembly, will operate efficiently with a minimum amount of friction, is capable of being manufactured at a low cost and has no parts which are likely to become out of order. The present embodiment of the invention has been disclosed in detail since in actual practice it attains the features of advantages enumerated as desirable in the statement of the invention and the above description. It will be apparent, however, that changes of the details of construction may be resorted to without departing from the spirit and scope of the invention as hereinafter claimed or sacrificing any of its advantages.

Having described my invention, what I claim as new is:—

A device of the class described including a bracket having a recess, the bottom of which is provided with a slot and a pair of dished out seats aligned transversely of the slot and spaced therefrom, and a hook comprising a T-shaped shank to include a stem and a cross head, the cross head terminating in depending balls restable in the seats, said head being insertable into the recess through the slots.

In testimony whereof I affix my signature.

BENJAMIN F. MOORE.